(12) United States Patent
Sirotin et al.

(10) Patent No.: US 11,720,448 B1
(45) Date of Patent: Aug. 8, 2023

(54) APPLICATION AWARE BACKUPS

(71) Applicant: Amazon Technologies, Inc., Seattle, WA (US)

(72) Inventors: Alexander Sirotin, Coquitlam (CA); Aditya Maruvada, Bothell, WA (US); Tony Zoght, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/482,174

(22) Filed: Sep. 22, 2021

(51) Int. Cl.
*G06F 11/14* (2006.01)

(52) U.S. Cl.
CPC ...... *G06F 11/1464* (2013.01); *G06F 11/1451* (2013.01); *G06F 11/1461* (2013.01); *G06F 11/1469* (2013.01); *G06F 2201/84* (2013.01)

(58) Field of Classification Search
CPC ............ G06F 11/1464; G06F 11/1451; G06F 11/1461; G06F 11/1469; G06F 2201/84
USPC ...................................... 714/4.11
See application file for complete search history.

(56) References Cited

U.S. PATENT DOCUMENTS

| | | | |
|---|---|---|---|
| 2010/0248707 A1* | 9/2010 | Hoffner | H04W 24/04 455/419 |
| 2014/0006858 A1* | 1/2014 | Helfman | G06F 11/1662 714/19 |

* cited by examiner

*Primary Examiner* — Yair Leibovich
(74) *Attorney, Agent, or Firm* — Davis Wright Tremaine LLP

(57) ABSTRACT

Systems and methods are described herein relating to backing up applications or applications stacks that utilize two or more computing resources. In some aspects, a snapshot of operating states of a collection of computing resources that operate collectively as an application may be captured and stored as an application recovery point. The application recovery point may include an application definition that identifies first and second computing resources usable to provide the application, a first computing resource recovery point, which upon restoration, restores the first computing resource according to the snapshot, and a second computing resource recovery point, which upon restoration, and restores the second computing resource according to the snapshot. Responsive to a request to restore the application using the recovery point, the collection of computing resources may be launched in a coordinated way to instantiate the application according to the application recovery point.

20 Claims, 7 Drawing Sheets

APPLICATION AWARE BACKUPS

BACKGROUND

Advances in the development and usage of virtual computing resources to provide various computing services to a wider range of customers and entities has resulted in the creation of more complex applications and processes to take advantage of the numerous resources that are available. These computing resources include various types of data storage, virtual computing systems, roles and permissions, and so on. As customers and entities become more reliant on such complex applications, backing up these computing resources becomes increasingly important. Backup services enable customers to protect their individual resources, by taking on-demand backup jobs for individual computing resources or creating backup plans, which can run according to a configured schedule. Customers may also want to add an additional fail-safe by copying their backups into different regions or accounts. However, while these back-up solutions provide some level of protection, it can be difficult or unfeasible to coordinate the backups of multiple different resources of a complex application in manner that enables the resources to be restored concurrently so as to restore the complex application to a previous state at a specific point in time.

BRIEF DESCRIPTION OF THE DRAWINGS

Various techniques will be described with reference to the drawings, in which.

DETAILED DESCRIPTION

Figure 1:
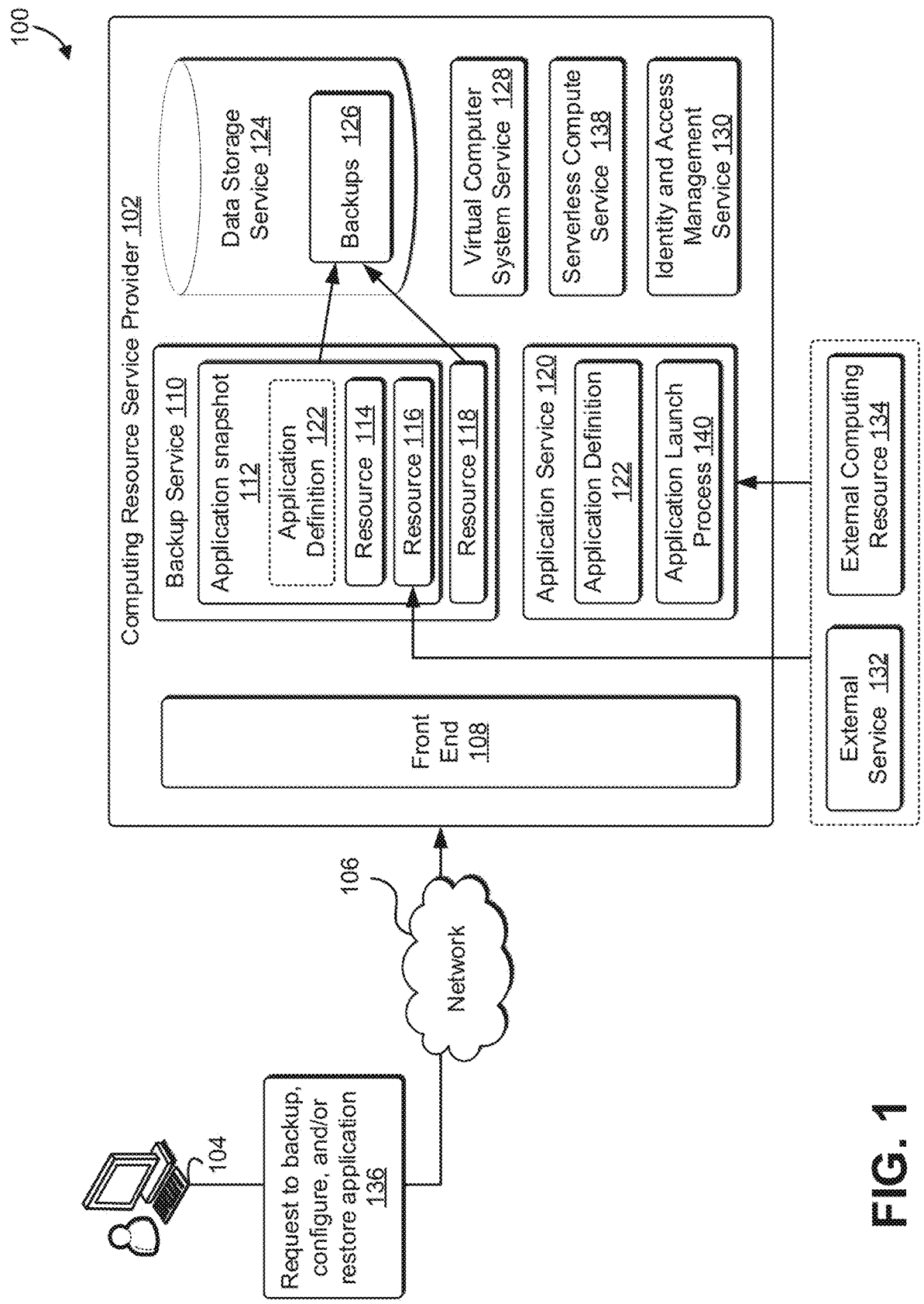
FIG. 1 illustrates an example environment in which the described techniques can be practiced, according to at least one embodiment.

Various systems and methods are described herein relating to creating and using an application recovery point to restore an application that utilizes multiple computing resources. In one aspect, an application or application stack may be defined by an application definition that specifies the use of multiple different computing resources to provide the application stack. In some cases, the application stack may be defined by a user, where the different computing resources may include any of a number of different computing resources and/or different computing resource types. For example, the computing resources utilized by the application stack may include data storage resources or services, such as block level, relational database, data cloud, and other formats of data storage, virtual computing systems such as virtual machines, containers, etc., serverless computing resources, and/or various stateless resources, such as roles, permissions, etc. In order to provide more robust data recovery and backup options for these more complex application stacks (as compared to a single computing resource), a snapshot of the application stack, including the collection of computing resources used to provide the application stack, may be captured and stored as an application recovery point. The application recovery point, upon selection, may subsequently be used to restore an instance of the application, including the collection of resources that make up the application stack, according to the selected application recovery point. In this way, recovering a collection of computing resources that operate collectively to instantiate an application stack may be much more efficient and more readily accessible and configurable.

In some aspects, the application recovery point may include dependent recovery points for each of the stateful computing resources that make up the application stack. These dependent recovery points may be individually selectable, to restore individual computing resources of the application stack. In some cases, stateless resources, such as roles, permissions, etc., may also be captured via a snapshot of an application stack, such that upon restoration of the application stack using the application recovery point, the stateless resources may be restored. In some aspects, the described techniques may support backing up third party or external computing resources or services that may be provided or developed by sources external to a computing resource service provider. In these scenarios, the computing resource definition may be uploaded to the computing resource service provider and an identifier may be assigned to access that computing resource via the definition that is stored with the computing resource service provider. The identifier may be included in the application definition and captured in the snapshot to generate the application recovery point.

In some cases, the application definition may include logical identifiers of the computing resources that make up the application stack, such as may be assigned by a user to readily identify the different resources used in the application stack. When the snapshot of the collection of computing resources is taken, a backup identifier may be assigned to the recovery point for each dependent computing resource that make up the application recovery point/operates to provide in combination the application stack. When the backup service receives a request to restore an application stack, the service may retrieve the application definition that was stored in the application recovery point. The logical identifiers of the computing resources in the application definition may then be determined, and the backup identifiers of the specific recovery point for those resources may then be identified. The backup identifiers of the specific recovery points for the computing resources may then be inserted into the application definition to generate a recovery application definition. This recovery application definition may then be executed to launch an instance of the application stack, with the parameters/states defined in the application recovery point, to restore the application stack to a point in time when the snapshot was captured to create the application recovery point. Additionally or alternatively, the recovery application definition may also be copied, such as to a different region or different location, associated with the computing resource service provider, so that a copy of the application may be instantiated.

In some aspects, a user may manage various parameters for when to back up the application stack through a backup service, such as a set time period or interval, upon the occurrence of one or more triggering events or conditions, and the like. The backup service may, accordingly store multiple recovery points, including both application recovery points and individual computing resource recovery points that may form the application recover points. All of these various recovery points may be selectable, such as through one or more user interfaces, to enable precise control and restoration of computing resources and applications managed by the backup service. In some cases, in the event backup of an individual resource of an application or application stack fails, the remainder of the computing resources that make up the application or applications stack may be backed up, such that only a partial application recovery point is created. In this way, more robust backups and application recovery may be provided, even in the face of runtime errors.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages, including some or all of the following: (1) reducing the amount if inputs necessary to restore an application stack, (2) reducing memory requirements by saving backups in the form of already existing application definitions or templates, and various other advantages as will be described and made apparent throughout the rest of the disclosure.

FIG. 1 illustrates an example environment 100 in which a backup service 110 may be provided by a computing resource service provider 102. A client device 104 may interact with the computing resource service provider 102 via a front end 108 of computing resource service provider 102 over one or more networks 106 to interact with various data and services, such as through one or more of an application service 120, backup service 110, data storage service 124, virtual computer system service 128, function service 138, identify access and management service 130, various other services provided by the computing resource service provider 102, and services 132 or computing resources 134 that are supplied or provided by an entity external to the computing resource service provider 102 (e.g., an external source), as will be described in greater detail below.

Client 104 may refer to a client computer system or computing device connected to a server (e.g., computing resource service provider) over a network 106. In some cases, client 104 refers to a user or operator of a client computer system, and may be an employee of an organization that utilizes a computing resource service provider 102 to interact with various forms of data, such as through one or more of application service 120, backup service 110, data storage service 124, virtual computer system service 128, identify access and management service 130, or external service 132 or external computing resource 134.

Client 104 may submit a request 136 for access to various computing resources (e.g., services or computing resources thereof) of computing resource service provider 102. The request 136, in some examples, is a web service application programming interface request (also referred to simply as a web service request), may be received by a service of the computing resource service provider 102. As illustrated, the client 104 may submit a request 136 to access or interact with an application service 120 to create or configure an application, application stack, or process, and/or a backup service 110 to backup that application or process and restore the application. In some cases, the request 136 may include configuration parameter for the application/application stack, and/or parameters for backing up one or more applications/application stacks. In some cases, the request 136 may additionally include details of how different computing resources are linked or mapped to instantiate an application. The computing resources may be provided by the computing resource service provider 102, such as by data storage service 124, virtual computer system service 128, function service 138, or identify access and management service 130. In some examples, the computing resources may be defined by the client device 104 and may be uploaded from a third party or external service provider, such as in the case of external service 132 and external computing resource 134.

In some examples, request 136 may include configuration parameters to create an application or application stack. As used herein, an application stack may include multiple applications or processes (e.g., computing resources) that operate collectively to perform a variety of functions. An application may similarly be provided by multiple different computing resources. As such, the described techniques are applicable to both applications and application stacks. For ease of reference, the term "application" will be predominantly used throughout the present disclosure, but it should be appreciated that an applications stack is equally applicable. An example of an application, such as defined by an application definition, will be described in greater detail below in reference to FIG. 2. In either case, the request 136 may define what computing resources will be used to define or operate the application, and how they interoperate, such as may be captured in an application definition or configuration 122.

The request 136 may additionally or alternatively include parameters for configuring backup service 110 to capture the operating state of one or more applications or application stacks, such as may be provided by the application service 120. The parameters may include how often or what conditions need to be satisfied to back up a given application or application stack, where to store the snapshot or recovery points, what tags to use to identify certain resources, and so on. In some cases, the request 136 may include a request to restore the application from a recovery point or backup such as may be stored by the data storage service 124 as a backup 126. The process for restoring an application from an application recovery point or backup will be described in greater detail below.

In some cases, the front end 108 may receive the request and direct it to the appropriate service. The front end 108 may be a system including a set of web servers (e.g., a single web server or a set of web servers which may be managed by a load balancer) provided by the computing resource service provider 102. Web servers of the front end 108 may be configured to receive various requests and to process them according to one or more policies associated with the service. In at least one embodiment, client 104 uses client software that is configured to establish a client-server relationship with a service of a computing resource service provider 102. A client 104 may connect to a service via front end 108, which receives requests from clients and routes them to backend services. Front end 108 may interface with one or more of an application service 120, backup service

110, data storage service 124, virtual computer system service 128, function service 138, identify access and management service 130, offered by a computing resource service provider 102 to its customers via client devices 104. In some cases, front end 108 may also interact with external service 132 or external computing resource 134. In at least one embodiment, client 104 interacts with a graphical user interface (GUI) to interact with various data and configurations provided by or through the computing resource service provider 102, and client-side software translates the GUI setup to a web service API request which is transmitted from the client computer system 104 to front end 108 via a network 106.

The network 106 may include any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network 106 is enabled by wired and/or wireless connections and combinations thereof. In some cases, a network may include or refer specifically to a telephone network such as a public switched telephone network or plain old telephone service (POTS).

The computing resource service provider 102 may provide various services such as data processing, data storage, software applications, security, encryption, and/or other such services. A computing resource service provider described herein may be implemented using techniques described below in reference to FIG. 7. The computing resource service provider 102 may provide services that may be accessible through various software, hardware, and/or variations thereof. In some examples, the services may be implemented as software applications or services executing on various computing devices. Examples of such computing devices include one or more instances of a physical computing instance (e.g., a physical server computer, a mobile communication device, a laptop computer, a tablet computer, a personal computer, a mainframe, etc.) or one or more instances of a virtual computing instance, such as a virtual machine hosted on one or more computer servers, or other various capable computing systems.

In some examples, the computing resource service provider 102 may provide one or more of an application service 120, backup service 110, data storage service 124, virtual computer system service 128, function service 138, identify access and management service 130, and/or other service. Each of these services may provide ways for a customer to interact with various forms of data, including using the one or more services to configure applications, back up applications and restore applications.

As illustrated, the application service or application providing service 120 may be a collection of computing resources configured to provide one or more application or application stacks to perform various functions. The application service 120 may provide tools for customers to design, configure, provision, and operate different applications or application stacks through computing resources provided by the computing resource service provider 102 and/or customer defined processes of resources. In some cases the application service may support defining application infrastructure as a set of machine-readable definition files sometimes referred to as infrastructure as code ("IAC"). Infrastructure as code may include both declarative and imperative approaches. In the declarative technique, code describes the target configuration for the infrastructure of the application. In the imperative approach, code describes how infrastructure may be modified to meet the needs of the application. In general, any framework or tool that performs or changes or configures infrastructure using a programmatic method can be part of an infrastructure as code system. Examples of infrastructure as code frameworks include Microsoft Power Shell DSC or Amazon Web Services CloudFormation. Examples of tasks that can be performed using infrastructure as code include installing and configuring a database, installing a virtual network, installing and configuring a virtual machine, and configuring network policies. By performing these operations in code, management operations can be managed and delivered in the same way in which code is developed, rather than relying on a complex set of manual operational procedures and standards.

The application service 120 may configure and/or store one or more application definitions or templates 122, which define how various computing resources operate in conjunction with each other to provide various functions, as defined by a customer. In some cases, the application definition 122 may define an application or application stack. The application definition 122 may define the infrastructure of the application or set of applications as IAC and may reference one or a number of different computing resources, such as may be provided by one or more of data storage service 124, virtual computer system service 128, function service 138, or via customer defined instructions or code, via logical identifiers. The application definition 122 may be configured through communications, such as request 136 from client device 104. In some cases, the application service 120 may store application definitions 122 in the data storage service 124.

The application service 120 may also include an application launch process 140. The application launch process 140 may include any of a number of computing resources that execute an application definition 122 to launch a set of resources to provide an application or application stack. In some aspects, the application service 120 (via appropriately configured and authenticated API calls) may provision and/or access virtual computer systems that are instantiated on physical computing devices hosted and operated by the computing resource service provider 102. The virtual computer systems may be used for various purposes, such as to operate as servers supporting data storage for a customer coupled with compute capabilities to execute applications or application stacks.

The backup service 110 may be a collection of computing resources configured to take snapshots of one or more computing resources to generate recovery points for applications configured and provided by or through application service 120. In some cases, the backup service 110 may store snapshots or backups of computing resources and applications 112, 114, 116, 118 as backups 126 with a data storage service 124. In some cases, the application service 120 may access backups 126 to restore one or more applications, application stacks, and/or individual computing resources, such as using application launch process 140.

The backup service 110 may capture and/or store various computing resource and application stack snapshots 112, 114, 116, 118. As advantageously provided by the backup service 110, operating states of a collection of computing resources, such as defined by an application configuration or definition 122, may be captured and stored together as an application snapshot 112, such that the collection of resources may be restored in combination via a single selection of the application snapshot. The backup service 110 may provide this functionality by providing a hierarchy of recovery points for individual computing resources that together operate to provide an application or application stack. In the example illustrated, the application snapshot 112 may include an application definition 122, and two dependent resources 114, 116, that may be identified in the application definition 122 and usable to provide functionality of the application. The snapshots of resources 114, 116 may include a backup identifier that is usable to access specific snapshots of that resource taken at different points in time. In some aspects, a different, unique, backup identifier may be assigned to each different application snapshot.

The data storage service 124 may interact with application service 120 and/or the backup service 110 to store application definitions, backup recovery points 126, and/or provide data storage for one or more application. Data storage service 124 may be an on-demand data storage service, such as an object-based data storage service, and may be configured to store various forms of media. The data storage service 124 may be implemented on a computer system, or abstraction thereof (such as one or more virtual machines, software containers, or other computing resource abstractions), implemented using hardware and software, and may comprise one or more processors and memory that stores executable instructions whose execution by the one or more processors causes the computer system to perform operations described herein.

The data storage service 124 and/or the data backup 126 may include one or more data objects, which may have arbitrary sizes and may, in some instances, have constraints on size. Thus, the data storage service 124 may store numerous data objects of varying sizes. The data storage service 124 may operate as a key value store that associates data objects with identifiers of the data objects which may be used by the client 104 to retrieve or perform other operations in connection with the data objects stored by the data storage service 124. Access to the data storage service 124 may be through application programming interface (API) calls to the service or via an interface, such as a graphical user interface (GUI).

In some cases, the data storage service 124 may operate as a key value store that associates data objects with identifiers of the data objects which may be used by the client 104 to retrieve or perform other operations in connection with the data objects stored by the data storage service 124. Access to the data storage service 124 may be through application programming interface (API) calls to the service, for example from either directly from client 104, or via the computing resource service provider 102. It should be appreciated that the data storage service 124 may additionally or alternatively provide non-object based data storage, such as block data storage, table-oriented data storage, relational databases, file-based storage, and the like. The data storage service 124 may also implement an archival system or process that stores certain data objects in different storage locations, devices, etc., for example, based on access to those data objects or other factors. For example, some data objects that have not been accessed for a certain period of time may be moved from a storage device or location (e.g., referred to herein generally as storage class) that provides prompt access, albeit at increased cost, to a more cost effective storage class that may provide access with some delay, different redundancy, or other attributes.

The virtual computer system service 128 may be a collection of computing resources configured to instantiate virtual machine (VM) instances on behalf of the customer 104. The customer 104 may interact with the virtual computer system service 128 (via appropriately configured and authenticated API calls) to provision and operate virtual computer systems that may be instantiated on physical computing devices hosted and operated by the computing resource service provider 102. The virtual computer systems may be used for various purposes, such as to operate as servers supporting a website, to operate business applications or, generally, to serve as computing power for the customer. Other applications for the virtual computer systems may be to support database applications, electronic commerce applications, business applications and/or other applications. Although the virtual computer system service 128 may be shown in FIG. 1, any other computer system or computer system service may be utilized in the computing resource service provider 102, such as a computer system or computer system service that does not employ virtualization or instantiation and instead provisions computing resources on dedicated or shared computers/servers and/or other physical devices. In some cases, the virtual computer system service 128 may provide complete VMs with an operating system. In some cases, the virtual computer system service 128 may provide software containers or instances of such, where no operating system is provided.

In some aspects, virtual computer system service 128 may provide one or more software containers or container instances, which may be utilized in application definitions 122 by application service 120 and captured in recovery points by the backup service 110. A container, as referred to herein, may include code and all its dependencies such that an application (also referred to as a task) can run quickly and reliably in an isolated computing environment. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example by being launched within the same virtual machine. In contrast, virtual machines are an abstraction of the hardware layer (meaning that each virtual machine simulates a physical machine that can run software). Virtual machine technology can use one physical server to run the equivalent of many servers (each of which is called a virtual machine). While multiple virtual machines can run on one physical machine, each virtual machine typically has its own copy of an operating system, as well as the applications and their related files, libraries, and dependencies. Virtual machines are commonly referred to as compute instances or simply "instances." Some containers can be run on instances that are running a container agent, and some containers can be run on bare-metal servers.

The computing resource service provider 102 may also provide an identity and access management (IAM) service 130. The IAM service 130 may be a collection of computing resources, including physical resources, virtual resources, or combinations thereof, configured to control access to resources provided by the computing resource service provider 102. In some implementations, client device 104 may authenticate using credentials or an identity established with the computing resource service provider 102 by authentication performed through the IAM service 130, via techniques known in the art, to upload, access, and organize data managed by or through the application service 120, backup service 110, and/or various other services as provided by the computing resource service provider 102. In some aspects, the IAM service may manage access to customer data, application definitions 122, and/or backups 126, as may be stored by the data storage service 124, including implementing various security protocols to ensure that customer data 226 is secure.

The serverless compute service or function service 138 may that is configured to manage execution of program code functions. The function service 138 may be a "serverless" compute service that executes program code functions in response to requests or events, and the function service 138 may automatically manage underlying compute resources used to execute the program code functions. In particular, the function service 138 may manage execution of a variety of functions. The functions may be program code function, which may comprise a "serverless" function. For example, a program code function may be a segment of program code that may be like a function, and the program code function may receive parameters, perform processing, make service requests, and provide return values. In one example, a software container may be used to provide an isolated environment for a program code function to execute. The software container may contain the program code function (e.g., JAVA code, C# code, etc.) and any dependencies (e.g., library files) used to execute the program code function on a computing hub configuration (e.g., computing hub hardware and software). For example, operating system kernel functionality may be used to isolate computing resources and create separate namespaces in order to provide an isolated (containerized) user space for a program code function to execute. In doing so, the program code function may be contained to the isolated user space, allowing multiple containerized program code functions to utilize a single operating system kernel. Also, a runtime service may be loaded into the software container, and the runtime service may manage execution of the program code function and provide an interface between the operating system and the program code function executing inside of the software container. The function service 138 may manage execution of program code functions by allocating computing resources for executing a program code function in response to execution requests, launching the program code function, and deallocating the computing resources utilized by the program code function.

In some cases, the application service 120, backup service 110, and/or other services of the computing resource service provider may interact with one or more external services 132 and/or external computing resources 134. External services 132 may include or provide any of a variety of computing functions, data storage, etc., such as may be provided by a provider external to the computing resource service provider 102. Similarly, external computing resources 134 may include or provide any of a variety of computing functions, data storage, etc., such as may be defined by a customer, such as through client device 104. In some cases, the external computing resource 134 specification or program code may be uploaded to the computing resource service provider 102, such as in or stored in association with an application definition 122, to enable the application definition, upon execution, to instantiate and control the external computing resource 134.

It should be appreciated that the services and computing resources described above, as provided by the computing resource service provider 102, and resources external to the computing resource service provider 102, are only given by way of example. The techniques described herein for backing up and restoring applications or applications stacks that comprise an a number of different computing resources are equally applicable to a large variety of computing resources, functions, virtual resources, and so on.

Figure 2:
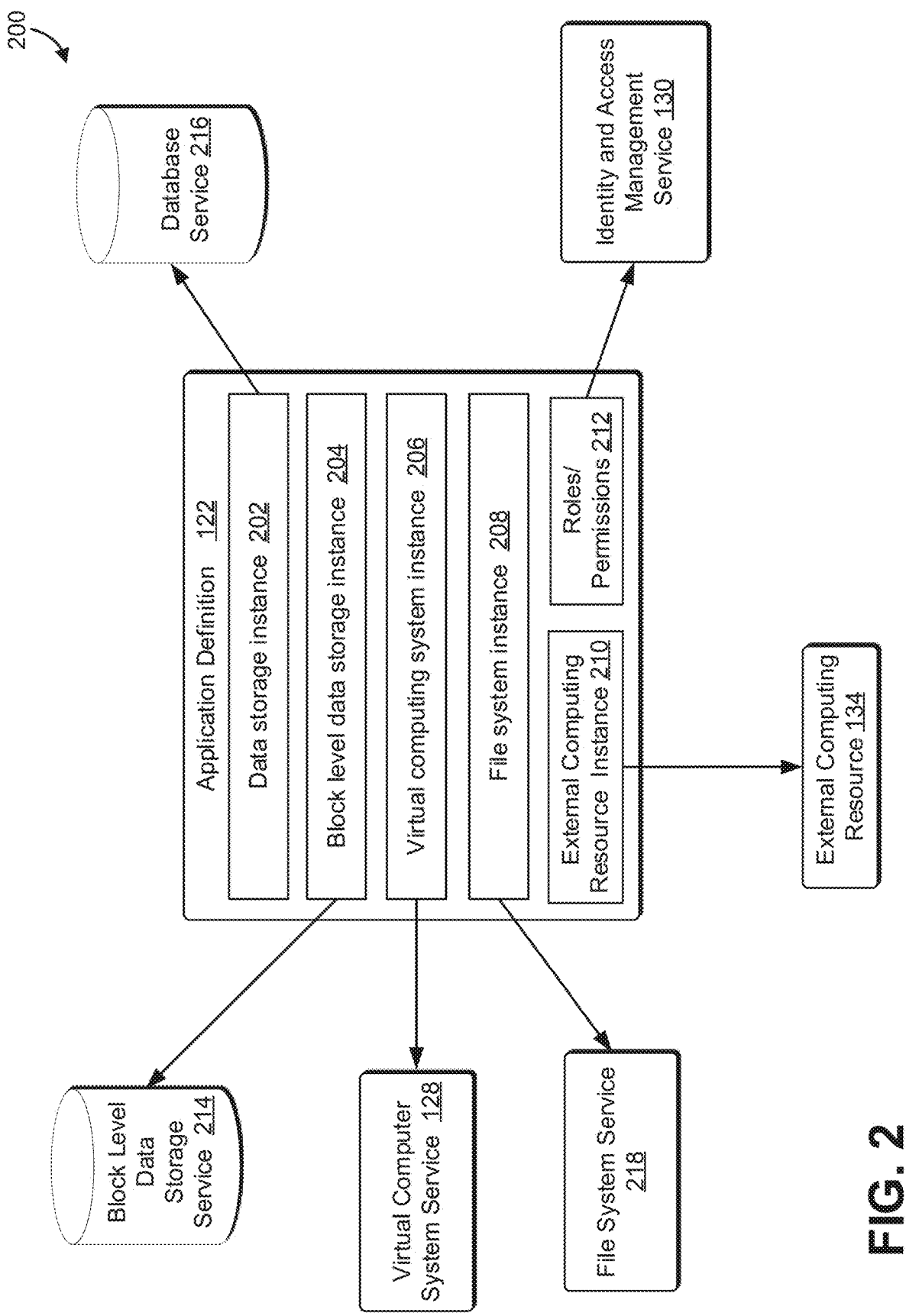
FIG. 2 illustrates an example of an application definition, according to at least one embodiment.

FIG. 2 illustrates an example of an application definition 122, such as may be used by the application service 120 and/or backup service 110 described above in reference to FIG. 1. Application definition 122 may define how a number of different computing resources are used to provide an application or application stack. Application definition 122 may define how these various computing resource interact with one another, such as what data is passed between the computing resources, what operations are performed on the data by a given computing resource, and what entities have access to certain portions of the data. In some cases, application definition 122 may be implement using IAC conventions or structure, such that enable efficient modification to the design or configuration of the application/application stack.

In the example illustrated, application definition 122 may include a reference to a data storage instance 202, such as may be provided by a database service 216. The reference may include any naming convention, such that identifies the computing resource uniquely within the application definition (e.g., does not have to be globally unique). Similarly, the application definition may also include a reference to a block level data storage instance 204, provided by a block level data storage service 214, a virtual computing system instance 206, provided by a virtual computer system service 128, a file system instance 208 provided by a file system service 218, an external computing resource instance 210, provided by an external computing resource 134, and roles/permissions 212 provided by an IAM service 130, such as described above in reference to FIG. 1. Each reference, which may be referred to herein as a logical identifier or logical identifier (ID), may include any alpha numeric or other characters or symbols, and be of any length. It should be appreciated that application definition 122 may reference or include other computing resources, (including one or more containers or container instance), such as may be provided by a service, such that is not illustrated. In some cases, any number of various computing resources of the same type and even same configuration may be specified in application definition 122.

The application definition 122 may include references to each of the computing resources 202-212 described above, such that when the application definition 122 is executed, the corresponding services and resources 216, 214, 128, 218, 134, and 130 may be called to instantiate an instance of the resource. The instantiated instance of each resource may then be assigned a unique identifier (e.g., globally unique to the service or computing resource service provider 102), such as may be referred to herein as a resource identifier or resource ID, and may include any alpha numeric or other characters or symbols, and be of any length. In some cases, a snapshot of an instance of a resource 202, 204, 206, 208, 210, and/or 212 at a point in time may be captured and stored. Each snapshot of an instance of a resource 202, 204, 206, 208, 210, and/or 212 may be assigned a backup ID. The backup ID of the resources 202, 204, 206, 208, 210, and/or 212 referenced in the application definition 122 may be added or appended back into the application definition 122, to restore the application using the application definition 122, as will be described in greater detail below.

Figure 3:
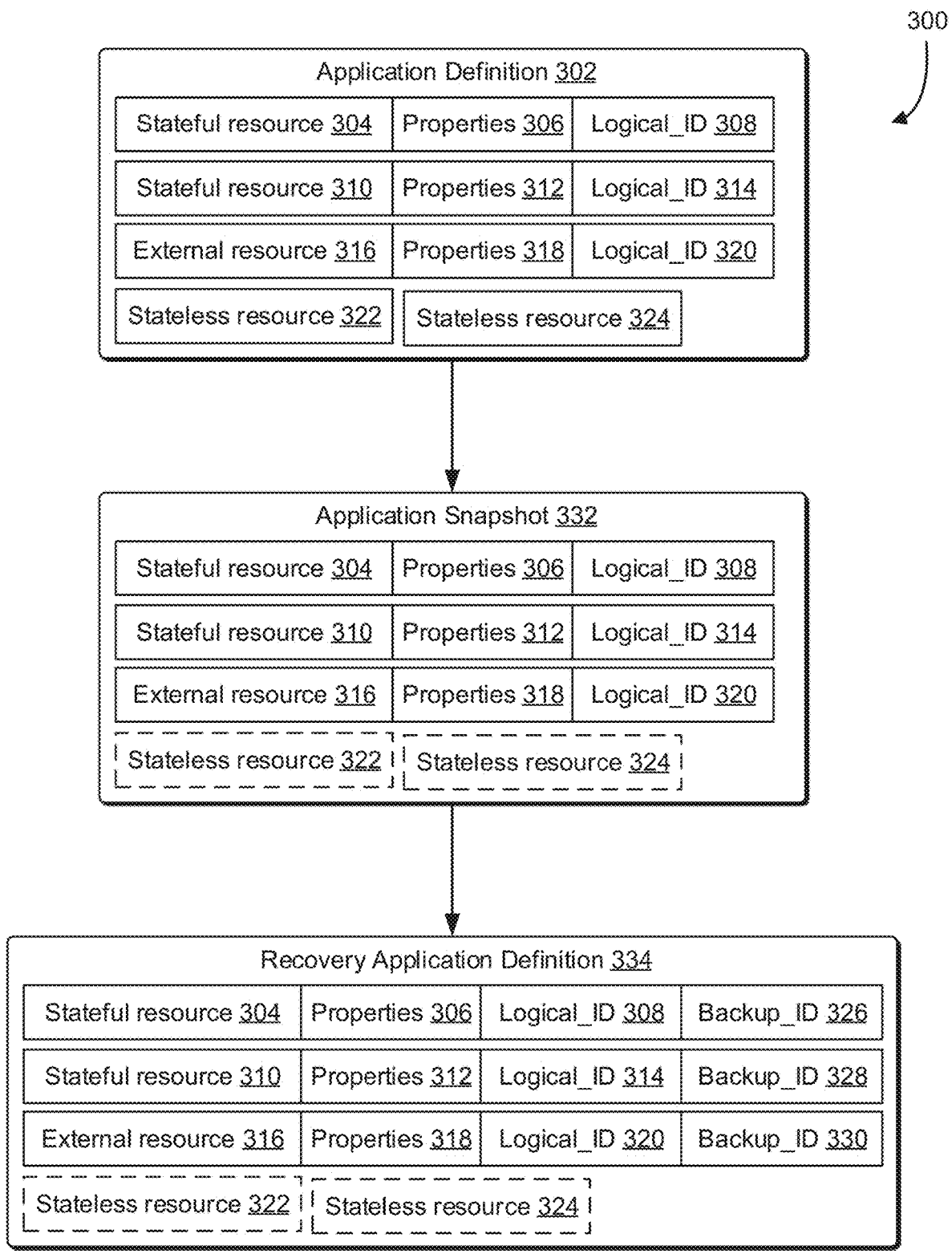
FIG. 3 illustrates example states of an application definition, according to at least one embodiment.

FIG. 3 illustrates example states of an application definition, such as application definition 122 as used by a backup service, such a backup service 110 described above in reference to FIGS. 1 and 2. As illustrated, an application definition 302 may first be generated in response to a customer, e.g., via a user interface, configuring an application or application stack that uses multiple computing resources to provide some service, generate or save data, etc. The application definition 302 may define any number of stateful resources 304, 310, having various properties 306, 312, and identified by logical IDs 308, 314. Logical IDs may refer to any naming convention, such as may be implemented by a client or customer. In other cases, logical IDs 308, 314, 320 may be replaced with a resource ID, which may identify the specific resource 304, 310, 316 in the sphere of the computing resource service provider that provides backup services, as described herein. In yet some cases, each resource 304, 310, 316 may include both a logical ID and a resource ID in a given application definition 302, such that one or more of a logical ID or a resource ID can be used to then determine a specific backup ID corresponding to a specific recovery point captured at a given time. The stateful resources 304, 310 may include any computing resources, such as those provided by one or more of services described above in reference to FIG. 1, such as a data storage service 124, virtual computer system service 128, function service 138, or identify access and management service 130, and/or other service. Each resource 304, 310 may have a given set of properties, such as size, volume type, input/output operations limits, availability or geographic zone where the resource is to be provided, etc. Each resource 304, 310 may also have a logical ID 308, 314, such as described above in reference to FIG. 2.

In some cases, application definition 302 may also include one or more references to external resources 316, such as may have associated properties 318, and a logical ID 320. In yet some aspects, the application definition 302 may also include one or more stateless resources 322, 324, as described above. An example of an application definition 302 is given below:

```
{
"TemplateFormatVersion": "2010-09-09",
"Parameters": {
  "RoleNameParam": {
    "Type": "String",
    "AllowedPattern" "[a-zA-Z0-9]*",
    "MinLength": "1",
    "MaxLength": "32",
  },
},
"Resources": {
  "myVolume1": {
    "Type": "data_storage:Volume",
    "Properties": {
      "Size": "100",
      "VolumeType": "io1",
      "Iops": "100",
      "AvailabilityZone": "us-west-2b"
    }
  },
  "myVolume2": {
    "Type": "data_storage:Volume",
    "Properties": {
      "Size": "100",
      "VolumeType": "io1",
      "Iops": "100",
      "AvailabilityZone": "us-west-2b"
    }
  },
```

-continued

```
"myIamRole": {
  "Type": " IAM::Role",
  "Properties": {
    "RoleName": { "Ref" : "RoleNameParam" },
    "AssumeRolePolicyDocument": {
      "Version": "2012-10-17",
      "Statement": [
      {
        "Effect": "Allow",
        "Principal": {
          "Service": [ "" ]
        },
        "Action": [ "sts:AssumeRole" ]
      }
      ]
    },
    "ManagedPolicyID": [
      "access_policy"
    ]
  }
}
```

When an application is to be backed up, such as by backup service 110, a snapshot of the application definition 332 may be captured and stored. In some cases, the snapshot 332 may be similar to and include the same information as the application definition 302 itself. In some cases, capturing stateless resources 322 and 324, such as roles, permissions, etc., in the snapshot 332 may be optional. Similarly, operating states of the resources identified in the application definition 302 may be captured as well, and associated with the application snapshot 332 as a recovery point for the application. An example application recovery point will be described in greater detail below in reference to FIG. 4.

To restore the application from the application snapshot 332, backup IDs 326, 328, 330 of the computing resources identified in the application snapshot 332 may be added to the application definition 302 to form a recovery application definition 334. The backup IDs 326, 328, 330 may be obtained from snapshots of the actual instantiations of the computing resources created when the application snapshot 332 is captured or obtained. The backup IDs 326, 328, 330 may include the complete definition or a reference to the complete defection of the computing resources, e.g., the operating states of the resources, captured at a point in time when the snapshot was taken. Adding the backup IDs 326, 328, 330 back into the application definition 302 to form the recovery application definition 334 may allow for an execution engine, such as of application service 120, to execute the application according to the state it possessed when the snapshot 332 was captured. In some cases, the recovery application definition 334 may or may not include the stateless resources 322, 324. An example of a recovery application definition 334 is provided below, with the inserted backup ID's highlighted.

```
{
"TemplateFormatVersion": "2010-09-09",
"Parameters": {
  "RoleNameParam": {
    "Type": "String",
    "AllowedPattern" "[a-zA-Z0-9]*",
    "MinLength": "1",
    "MaxLength": "32",
  },
},
```

```
    "Resources": {
      "myVolume1": {
        "Type": " data_storage:Volume",
        "Properties": {
          "Size": "100",
          "VolumeType": "io1",
          "Iops": "100",
          "AvailabilityZone": "us-west-2b"
          "SnapshotId": "snap-12345"
        }
      },
      "myVolume2": {
        "Type": "data_storage:Volume",
        "Properties": {
          "Size": "100",
          "VolumeType": "io1",
          "Iops": "100",
          "AvailabilityZone": "us-west-2b"
          "SnapshotId": "snap-67890"
        }
      },
      "myIamRole": {
        "Type": " IAM::Role",
        "Properties": {
          "RoleName": { "Ref" : "RoleNameParam" }
          "AssumeRolePolicyDocument": {
            "Version": "2012-10-17",
            "Statement": [
              {
                "Effect": "Allow",
                "Principal": {
                   "Service": [ "" ]
                },
                "Action": [ "sts:AssumeRole" ]
              }
            ]
          },
          "ManagedPolicyIDs": [
            ""access_policy"
          ]
        }
    }
```

Figure 4:
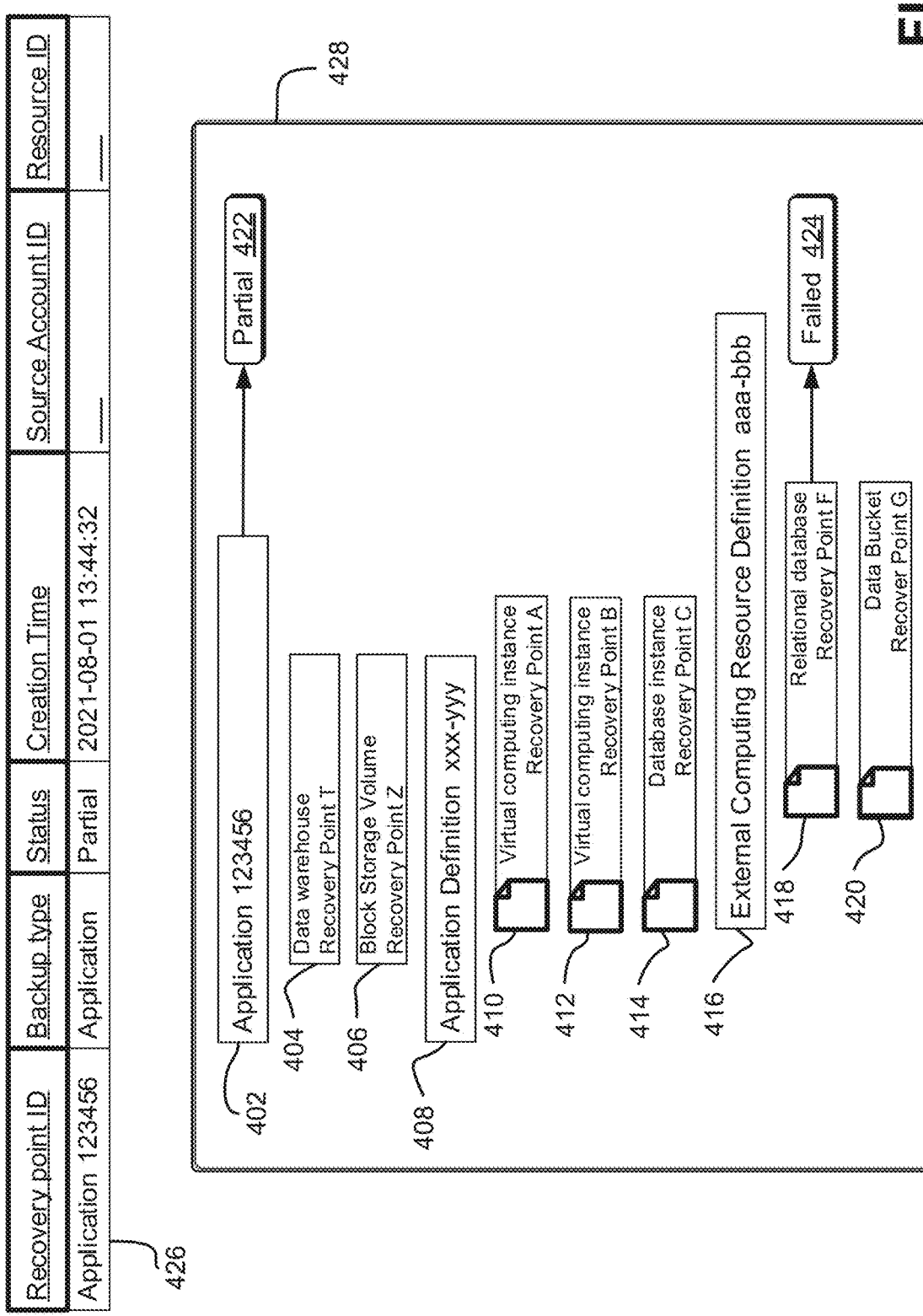
FIG. 4 illustrates an example of an application recovery point, which may be generated by the backup service described in reference to FIG. 1, according to at least one embodiment.

FIG. 4 illustrates an example of data structures 400 representing application recovery points which may be an example of how an application snapshot 112, generated by the backup service 110 as described above in reference to FIG. 1, is stored. Snapshots of computing resources, applications, applications stacks (e.g., a definition containing multiple applications) may be taken of computing resources to generate recovery points, at various points in time, such according to a predefined schedule, in response to occurrence of triggering events, and so on. As described herein, these recovery points may be hierarchical in nature, such that they may contain one or more application definitions and dependent computing resources snapshots, such of computing resources that are part of the application definition. Each collection of data objects, such as one or more application definitions, and related computing resource snapshots, may form a recovery point. Each recovery point may, after being captured and stored, be accessed and executed to restore the computing resources, application, or applications to the state captured in the recovery point. As used herein, a recovery point that includes multiple computing resource snapshots/recovery points and/or an application definition may be referred to as an application recovery point.

As illustrated, each application recovery point 426 may be defined or stored as a row in a table, such as maintained as a backup, such as backup 126 as described above in reference to FIG. 1. It should be appreciated that application recovery points, such as application recovery point 426 may similarly be stored in any of a variety of forms, types of data storage etc. In some examples, an application recovery point 426 may be stored as a data structure or object, and may include a number of attributes, including a recovery point ID; a backup type (e.g., application, application stack, or computing resource); a status, which may indicate whether the recovery point is a partial snapshot, such that a snapshot of at least one resource was not captured, or complete, indicating that all resources were effectively captured; a creation time, and in some cases, a source ID account (e.g., owner of the recovery point) and/or a resource ID (e.g., in the case that an individual resource was backed up and not an application).

In some aspects, a different application recovery point data structure 426 may be generated and stored for each time an application is backed up. In other cases, one full recovery point may be stored and only changes to that recovery point may be subsequently stored for a given duration. In this example, a new full recovery point (e.g., one that includes the application definition and snapshots/recovery points of all contained computing resources) may be stored, for example, every day, every week etc., and in between those recovery points, only changes to that recovery point may be stored, instead of all the data contained in the recovery point.

As also illustrated, application recovery point 426 may contain various data 428 indicating or including one or more application definitions 408, 426, and various computing resource recovery points 404, 406, 410, 412, 414, 418, 420. As described above, resource recovery points 404, 406, 410, 412, 414, 418, 420 may include a backup ID of the computing resource captured at a given point of time, and/or may include the partial or entire state of the computing resource captured at that point in time. In some cases, the data contained in each recovery point may vary, for example, based on the origin of the computing resource (e.g., provided by the computing resource service provider, or an external service/provided by a customer), based on the type of resource and how large the definition of the computing resource is (e.g., data volume versus virtual instance, container, function, etc.), and/or based on other factors.

In some cases, the hierarchical structure of an application recovery point may include multiple applications, such as may be dependent on one another. In the illustrated example, external computing resource definition aaa-bbb 416 may be part of application definition xxx-yyy 408. In this example, the application definition xxx-yyy 408 may define a virtual computing instance, a database instance, and external computing resource definition aaa-bbb, which may further include a relation database and a data bucket or other type of data store. In some cases, one or multiple recovery points for a given computing resource may be stored in the application recovery point. For example, there may be two distinct recovery points 410, 412 for the virtual computing instance of application definition xxx-yyy 408. In some aspects, various of computing resource recovery points 404, 406, 410, 412, 414, 418, 420 may be associated with one, multiple, or no application definitions.

In some cases, during the process of backing up an application, such as the application represented by application recovery point 426/428, one or more computing resources may not be adequately captured, such that a complete recovery point for that resource may not be stored. In this instance, the remainder of the application may still be backed up and an application recovery point saved, without the recovery point for the failed application. As illustrated, the recovery point for a relational database 418 may have failed to be captured/stored. In this instance, the reminder of the application recovery point may be stored, with an indicator of partial or complete. The ability to only partially capture/save an application recovery point may be particularly useful when the application or application itself is complex, including multiple different computing resources. In this example, it may be possible to identify a prior application recovery point and retrieve a prior recovery point for the failed computing resource. While this may not provide a complete recovery of the application at a given point in time, it may provide beneficial, particularly when some resources are not modified to a great extent during execution of the application or application stack.

Figure 5:
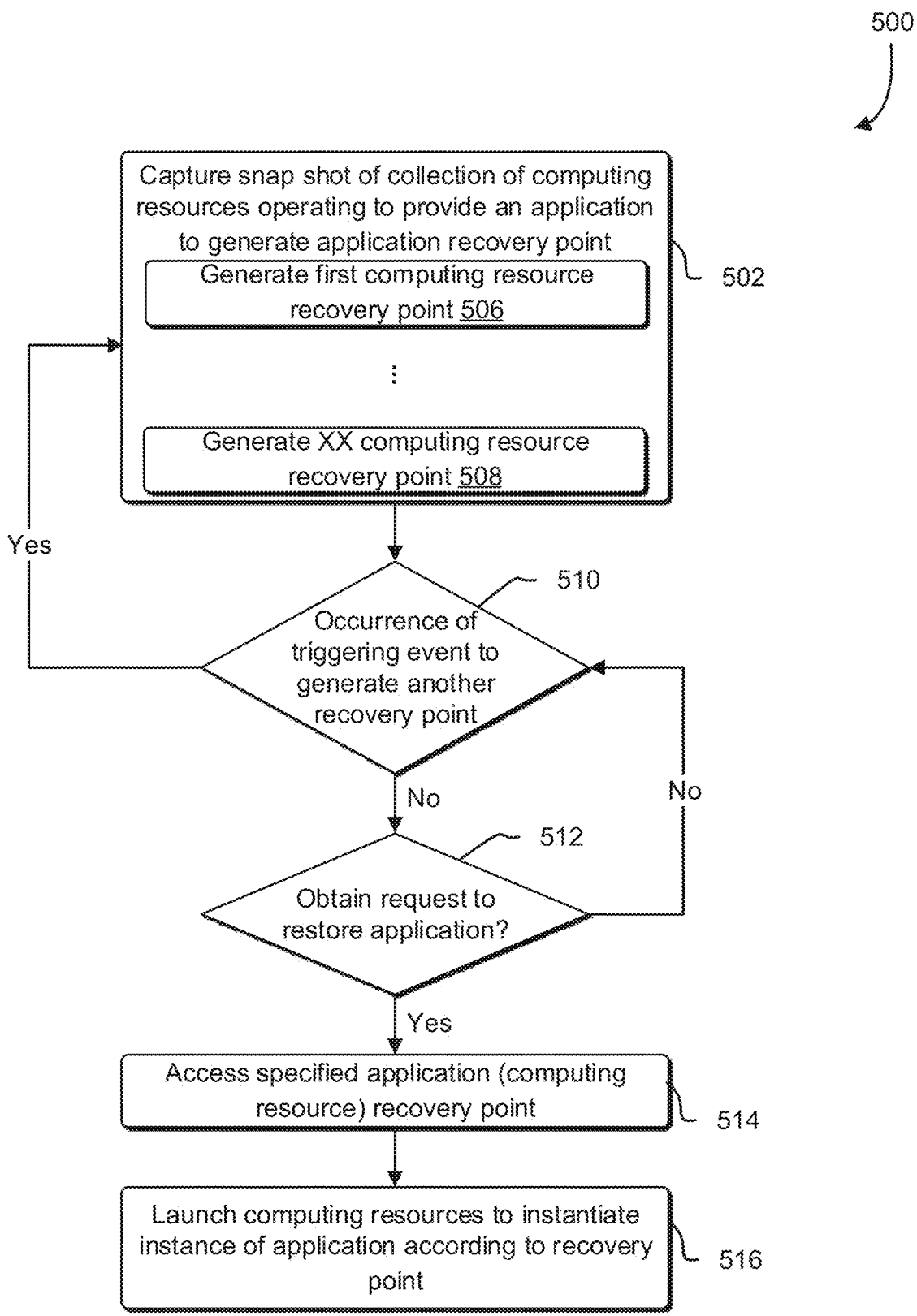
FIG. 5 illustrates an example process for generating and using an application recovery point to restore an application, according to at least one embodiment.

FIG. 5 illustrates an example process 500 for generating and using an application recovery point to restore an application. In some examples, process 500 may be performed by backup service 110 and/or application service 120, as described above in reference to FIG. 1.

Process 500 may begin at operation 502, in which snapshots of a collection of computing resources that collectively operate to provide an application, may be captured to generate an application recovery point. In some aspects, process 502 may include generating a first computing resource recovery point, at operation 506, and any additional number of computing resource recovery points, as may be used to provide the application, at operation 508. In some cases, operation 502 may be performed on a live or running application. In yet some instances, the application recovery point may include one or more of data structures 426, 428 described above in reference to FIG. 4.

Process 500 may proceed to operation 510, in which it may be determined if a triggering event has occurred that prompts generating another recovery point for the application. In some cases, the triggering point may be an amount of time that has elapsed (e.g., where the backup service generates a new backup periodically), or based on some other triggering event. Other types of triggering events may include new data or an amount of new data being stored in association with the application, events as may defined or occur within execution of the application (e.g., a new account has been created), or various other types and kinds of events. If a triggering event does occur, process may loop back to operation 502 and another application recovery point may be generated, and then process 500 may return to operation 510.

In the event that a triggering event has not occurred, at operation 510, process 500 may proceed to operation 512, in which it may be determined if a request to restore the application has been received. If no restore request has been received, process 500 may loop back to operation 510, etc. If a restore request has been received, then an application recovery point, such as may be indicated in the request, may be accessed, at operation 514. In some cases, the recovery point may be indicated by an identifier or a time at which the recovery point was captured. Using that identifier, the application recovery point may be obtained, and instances of the computing resources included in the application recovery point may be launched or instantiated according to information contained in the corresponding resource recovery point to launch the application, at operation 516. In some examples, operation 510 and 512 may be performed in parallel, such that the performance of operation 512 does not depend on the outcome of operation 510.

Figure 6:
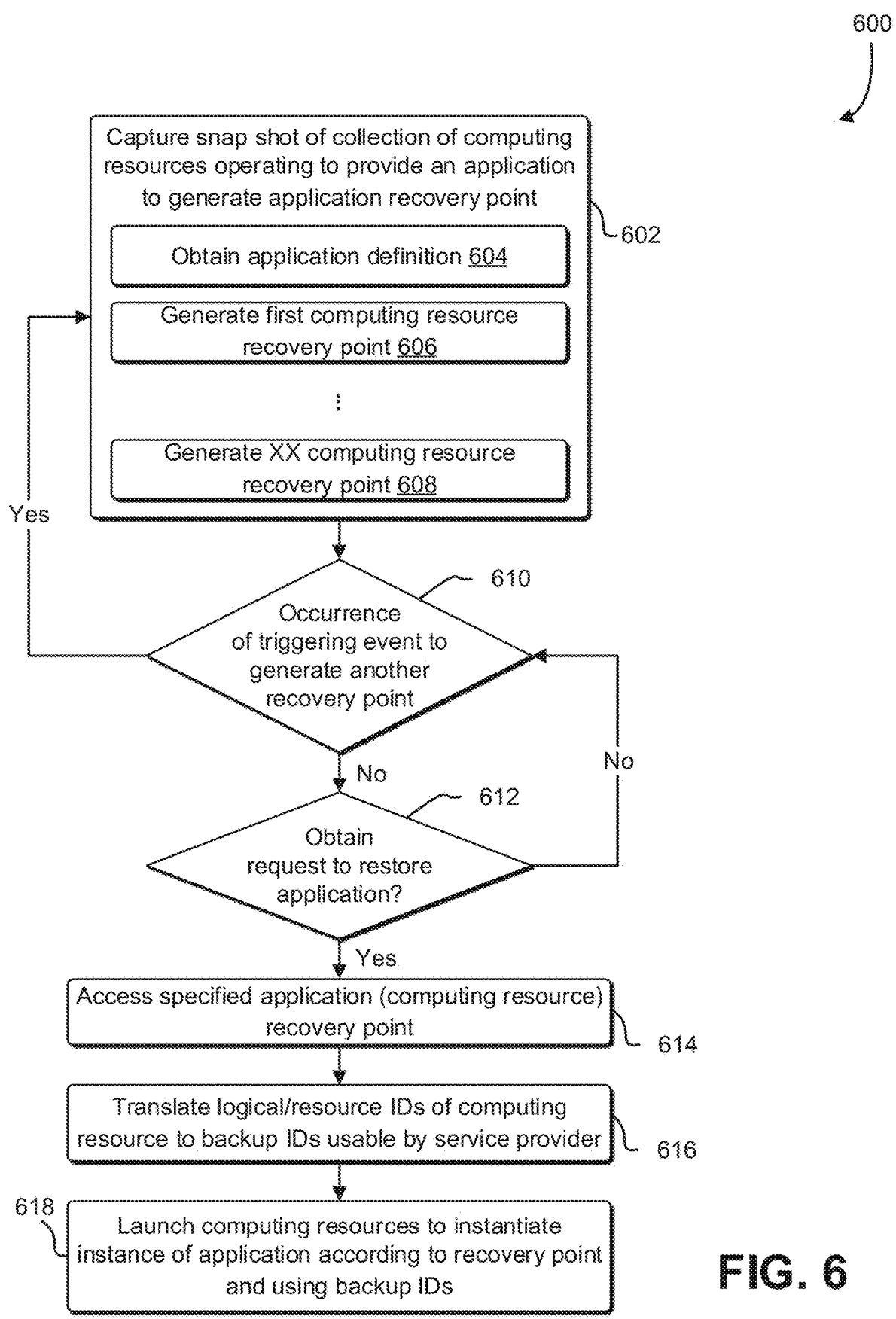
FIG. 6 illustrates another example process for generating and using an application recovery point to restore an application, according to at least one embodiment.

FIG. 6 illustrates another example process 600 for generating and using an application recovery point to restore an application. In some examples, process 600 may be performed by backup service 110 and/or application service 120, as described above in reference to FIG. 1.

Process 600 may begin at operation 602, in which snapshots of a collection of computing resources that collectively operate to provide an application, may be captured to generate an application recovery point. In some aspects, process 602 may also include obtaining an application definition that defines the application to be backed up and/or restored, at operation 604. In some cases, the application definition may include one or more aspects of application definition 122 and 302 described above in reference to FIGS. 1-3. The application definition may specify a number of computing resources that comprise the application. In some cases, process 602 may additionally include generating a first computing resource recovery point, at operation 606, and any additional number of computing resource recovery points, as may be used to provide the application, at operation 608. In some cases, operation 602 may be performed on a live or running application. In yet some instances, the application recovery point may include one or more of application snapshot 332 and/or data structures 426, 428 described above in reference to FIGS. 3 and 4.

Process 600 may proceed to operation 610, in which it may be determined if a triggering event has occurred that prompts generating another recovery point for the application. If a triggering event does occur, process 600 may loop back to operation 602 and another application recovery point may be generated, and then process 600 may return to operation 610. In the event that a triggering event has not occurred, at operation 610, process 600 may proceed to operation 612, in which it may be determined if a request to restore the application has been received. If no restore request has been received, process 600 may loop back to operation 610, etc. If a restore request has been received, then an application recovery point, such as may be indicated in the request, may be accessed, at operation 614. In some examples, operation 610 and 612 may be performed in parallel, such that the performance of operation 612 does not depend on the outcome of operation 610. Stated another way, operation 610 may be performed independently of operation 612, such that upon completion of operations 602/608, operations 610 and 612 may be performed concurrently.

In some aspects, the logical IDs (e.g., names used to identify resources) or resource IDS (e.g., IDs usable by the service provider to access the underlying resources) of the computing resources identified in the application definition specified in the application recovery point may be translated to backup IDs of the captured snapshots of the resources themselves (e.g., as indicated in the computing resource recovery points generated at operations 606 and 608), at operation 616. In some cases, operation 616 may include appending the backup IDs of the resources into the application definition to generate a recovery application definition, such as recovery application definition 334 described above in reference to FIG. 3. In some cases, the backup IDs of the resources may take a variety of forms, such as may be used by the provider of the resources themselves, such a computing resource service provider 102 described above.

Using the recovery application definition, instances of the computing resources of the application may be launched or instantiated according to information contained in the corresponding resource recovery point to launch the application, at operation 616.

Figure 7:
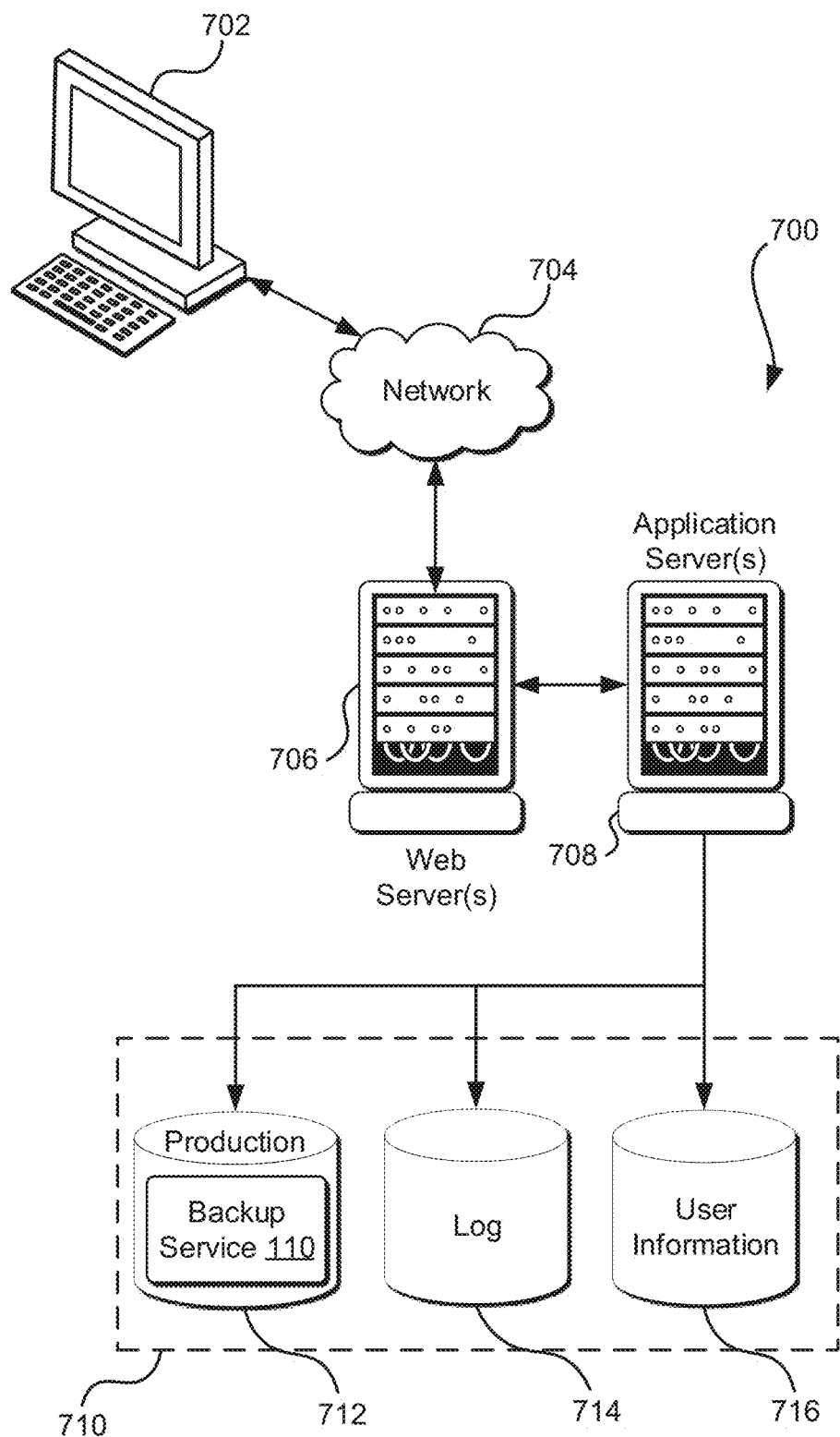
FIG. 7 illustrates a system in which various embodiments can be implemented.

FIG. 7 illustrates aspects of an example system 700 for implementing aspects in accordance with an embodiment. As will be appreciated, although a web-based system is used for purposes of explanation, different systems may be used, as appropriate, to implement various embodiments. In an embodiment, the system includes an electronic client device 702, which includes any appropriate device operable to send and/or receive requests, messages, or information over an appropriate network 704 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 706 for receiving requests and serving content in response thereto, although for other networks an alternative device serving a similar purpose could be used as would be apparent to one of ordinary skill in the art.

In an embodiment, the illustrative system includes at least one application server 708 and a data store 710, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 702 and the application server 708, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 710, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 712 and user information 716, which are used to serve content for the production side. The data store also is shown to include a mechanism for storing log data 714, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 710.

In some aspects, a backup service, such as backup service 110 descried above in reference to FIG. 1, may be provided by system 700. In some aspects, backup service 110 may be part of product data 712. In some cases, backup service 110 may access with user information 716, to store and access application backups, to facilitate backing up and restoring customer defined applications.

The data store 710, in an embodiment, is operable, through logic associated therewith, to receive instructions from the application server 708 and obtain, update or otherwise process data in response thereto, and the application server 708 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 702. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 700 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 700, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on".

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer-implemented method comprising:
obtaining an application definition that defines an application stack comprised of at least two computing resources hosted by a computing resource service provider, the application definition:
comprising resource identifiers of the at least two computing resources; and
being usable at least in part to instantiate the application stack to utilize the at least two computing resources;
storing a snapshot of the application stack as an application recovery point usable to launch a copy of the application stack, the application recovery point corresponding to a state of the application stack at a point in time and comprising the application definition and at least two dependent recovery points, an individual dependent recovery point of the at least two dependent recovery points usable to restore an individual computing resource of the at least two computing resources;
obtaining a request to restore the application stack using the application recovery point; and
responsive to obtaining the request, launching the copy of the application stack by:
obtaining backup identifiers of the at least two computing resources corresponding to the resource identifiers of the at least two computing resources from the application recovery point, the backup identifiers usable by the computing resource service provider to instantiate the at least two computing resources according to the at least two dependent recovery points;
injecting the backup identifiers of the at least two computing resources into the application definition to generate a recovery application definition; and
launching instances of the at least two computing resources, by the computing resource service provider, using the backup identifiers to instantiate the copy of the application stack according to the recovery application definition.

2. The computer-implemented method of claim 1, further comprising:
obtaining a request to restore a first resource of the at least two resources using a first dependent recovery point of the at least two dependent recovery points; and
launching, by the computing resource service provider, an instance of the first resource according to the first dependent recovery point.

3. The computer-implemented method of claim 1, further comprising:
obtaining a definition of a third computing resource, the third computing resource provided by an external source distinct from the computing resource service provider;
assigning the third computing resource a third backup identifier usable by the computing resource service provider to launch the third computing resource, wherein the application recovery point comprises the third backup identifier; and
responsive to obtaining the request, launching instances of the at least two resources and the third computing resource, by the computing resource service provider, using the backup identifiers and the third backup identifier to instantiate the copy of the application stack according to the application recovery point.

4. The computer-implemented method of claim 1, wherein:
the application definition further comprises at least one stateless resource, the at least one stateless resource comprising an set of permissions and a list of entities that can assume one or more particular roles within the computing resource service provider to provide the application stack; and
the snapshot captures the at least one stateless resource, such that the copy of the application stack comprises the at least one stateless resource.

5. A system, comprising:
at least one processor;
memory that stores computer-executable instructions that, as a result of being executed by the at least one processor, cause the system to:
capture a snapshot of operating states of a collection of computing resources, that operate collectively as an application, as an application recovery point, the application recovery point upon restoration, restoring the collection of computing resources according to the snapshot to provide a copy of the application, the application recovery point comprising:

an application definition that identifies a first computing resource and a second computing resource of the collection of computing resources usable to provide the application;
a first computing resource recovery point, which upon restoration, restores the first computing resource according to the snapshot; and
a second computing resource recovery point, which upon restoration, restores the second computing resource according to the snapshot;
obtain a request to launch a copy of the application using the application recovery point; and
responsive to obtaining the request, launch the collection of computing resources, to launch the copy of the application according to the application recovery point.

6. The system of claim 5, wherein the computer-executable instructions further include instructions that further cause the system to:
obtain a request to restore the first computing resource using the first computing resource recovery point; and
responsive to obtaining the request to restore the first computing resource, launching an instance of the first computing resource according to the first computing resource recovery point.

7. The system of claim 5, wherein the first computing resource and the second computing resource are identified, within application definition, by first and second identifiers that are specific to a computing resource service provider that provides the first computing resource and the second computing resource.

8. The system of claim 7, wherein the computer-executable instructions further include instructions that further cause the system to:
obtain a definition of a third computing resource, wherein the third computing resource is provided by an external source; and
map the definition of the third computing resource to a third identifier specific to the computing resource service provider, wherein the collection of computing resources comprises the third computing resource, such that an instance of the third computing resource is launchable by the computing resource service provider to instantiate a copy of the application.

9. The system of claim 5, wherein:
the snapshot comprises at least one stateless computing resource used in combination with the collection of computing resources to operate as the application; and
the computer-executable instructions further include instructions that further cause the system to instantiate the copy of the application according to the application recovery point at least in part by launching instances of the collection of computing resources and the at least one stateless computing resource.

10. The system of claim 5, wherein the application definition further comprises an application template usable to instantiate a copy of the application by an application provisioning service.

11. The system of claim 5, wherein the computer-executable instructions further include instructions that further cause the system to:
initiate launching instances of individual computing resources of the collection of computing resources concurrently.

12. The system of claim 5, wherein the application definition further identifies a third computing resource usable in combination with the first computing resource and the second computing resource to provide the copy of the application, wherein the computer-executable instructions further include instructions that further cause the system to:
indicate, in response to determining that a third computing resource recovery point was not captured in the application recovery point, that the application recovery point is only partially complete but operative to launch instances of the first computing resource and the second computing resource, to instantiate the copy of the application according to the partially complete application recovery point.

13. The system of claim 5, wherein:
the first computing resource comprises a virtual computing system instance; and
the second computing resource comprises a data store accessible by the virtual computing system to generate an output of the application.

14. A non-transitory computer-readable storage medium storing thereon executable instructions that, as a result of being executed by one or more processors of a computer system, cause the computer system to at least:
obtain an application definition comprising identifiers of at least two computing resources, wherein the at least two computing resources are provided by a computing resource service provider, and, in combination, collectively operate as an application;
capture a snapshot of the application to generate an application recovery point usable to restore the application, the application recovery point corresponding to a state of the application at a point in time and usable to restore states of the at least two computing resources at the point in time; and
responsive to obtaining a request to restore the application using the application recovery point, launch instances of the at least two computing resources according to the states of the at least two computing resources at the point in time so as to launch a copy of the application according to the application recovery point.

15. The non-transitory computer-readable storage medium of claim 14, wherein the instructions further comprise additional instructions that, as a result of being executed by the one or more processors, cause the computer system to generate the application recovery point to further include:
a first computing resource recovery point corresponding to an operational state of a first computing resource of the at least two computing resources; and
a second computing resource recovery point corresponding to an operational state of a second computing resource of the at least two computing resources.

16. The non-transitory computer-readable storage medium of claim 15, wherein the application recovery point comprises the first computing resource recovery point and the second computing resource recovery point such that the application recovery point, the first computing resource recovery point and the at second computing resource recovery point are individually selectable to launch the copy of the application, or instances of the first computing resource or the second computing resource, respectively.

17. The non-transitory computer-readable storage medium of claim 16, wherein the instructions further comprise second additional instructions that, as a result of being executed by the one or more processors, cause the computer system to:
insert identifiers of the first computing resource recovery point and the second computing resource recovery point into the application definition to generate a recovery application definition; and launch instances of the at least two computing resources according to the states of the at least two computing resources at the point in time so as to launch the copy of the application using the recovery application definition.

18. The non-transitory computer-readable storage medium of claim 15, wherein the instructions further comprise second additional instructions that, as a result of being executed by the one or more processors, cause the computer system to:

obtain a request to restore the first computing resource using the first computing resource recovery point; and responsive to obtaining the request to restore the first computing resource, launching an instance of the first computing resource according to the first computing resource recovery point.

19. The non-transitory computer-readable storage medium of claim 14, wherein:

the snapshot further comprises at least one stateless computing resource, used in combination with the at least two computing resources, that collectively operate as the application; and the instructions further comprise instructions that, as a result of being executed by the one or more processors, cause the computer system to, responsive to obtaining the request to restore the application using the application recovery point, launch instances of the at least two computing resources to the states of the at least two computing resources and the at least one stateless resource so as to launch the copy of the application according to the application recovery point.

20. The non-transitory computer-readable storage medium of claim 14, wherein the instructions further comprise instructions that, as a result of being executed by the one or more processors, cause the computer system to:

obtain a definition of a third computing resource, wherein the third computing resource is provided by an external source; and map the definition of the third computing resource to a third identifier specific to the computing resource service provider and append the third identifier to the application definition; and responsive to obtaining the request to restore the application using the application recovery point, launch instances of the at least two computing resources and the third computing resource to the states of the at least two computing resources so as to launch the copy of the application using the application definition.

\* \* \* \* \*